United States Patent
Onishi et al.

(10) Patent No.: US 10,829,348 B2
(45) Date of Patent: Nov. 10, 2020

(54) WORKING MACHINE AND OPERATION SYSTEM FOR WORKING MACHINE

(71) Applicant: TADANO LTD., Kagawa (JP)

(72) Inventors: Kazuhisa Onishi, Kagawa (JP); Takero Ikiyama, Kagawa (JP)

(73) Assignee: TADANO LTD., Kagawa (JP)

( * ) Notice: Subject to any disclaimer, the term of this patent is extended or adjusted under 35 U.S.C. 154(b) by 98 days.

(21) Appl. No.: 16/073,481

(22) PCT Filed: Feb. 27, 2017

(86) PCT No.: PCT/JP2017/007514
§ 371 (c)(1),
(2) Date: Jul. 27, 2018

(87) PCT Pub. No.: WO2017/150454
PCT Pub. Date: Sep. 8, 2017

(65) Prior Publication Data
US 2019/0031476 A1    Jan. 31, 2019

(30) Foreign Application Priority Data
Mar. 3, 2016 (JP) ................... 2016-040682

(51) Int. Cl.
*B66C 13/40* (2006.01)
*B66C 13/16* (2006.01)

(52) U.S. Cl.
CPC .............. *B66C 13/40* (2013.01); *B66C 13/16* (2013.01)

(58) Field of Classification Search
CPC ......... B66C 13/40; B66C 13/16; B66C 15/00; G05B 19/0428; G05B 19/042
(Continued)

(56) References Cited

U.S. PATENT DOCUMENTS 5,088,020 A * 2/1992 Nishida .................... E02F 3/384
                                                           414/699
5,226,487 A * 7/1993 Spektor .................. E21B 4/145
                                                           173/133
(Continued)

FOREIGN PATENT DOCUMENTS

EP    0549541 A1    6/1993
EP    1887148 A2    2/2008
(Continued)

OTHER PUBLICATIONS

May 30, 2017, International Search Report issued for related PCT application No. PCT/JP2017/007514.
(Continued)

*Primary Examiner* — Muhammad Shafi
(74) *Attorney, Agent, or Firm* — Paratus Law Group, PLLC

(57) ABSTRACT

There is provided a working machine that includes an operated function unit, an in-vehicle network to be connected to an operation terminal via an external network, an operation unit that transmits an intrinsic operation signal related to operation of the operated function unit to the in-vehicle network, and a control unit that is connected to the operation unit via the in-vehicle network and controls the operated function unit on the basis of either a false operation signal generated by the operation terminal or the intrinsic operation signal.

4 Claims, 1 Drawing Sheet

(58) Field of Classification Search
USPC .......................................................... 701/50
See application file for complete search history.

(56) References Cited

U.S. PATENT DOCUMENTS

| | | | |
|---|---|---|---|
| 8,151,207 B2* | 4/2012 | Shimazu | B60K 37/02 |
| | | | 715/772 |
| 8,452,465 B1 | 5/2013 | Sinha et al. | |
| 8,700,275 B2* | 4/2014 | Edamura | B60L 58/15 |
| | | | 701/50 |
| 2005/0004733 A1 | 1/2005 | Pillar et al. | |
| 2007/0028041 A1 | 2/2007 | Hallyal et al. | |
| 2010/0116767 A1 | 5/2010 | Schmid et al. | |
| 2013/0311052 A1* | 11/2013 | Edamura | E02F 9/123 |
| | | | 701/50 |

FOREIGN PATENT DOCUMENTS

| | | | |
|---|---|---|---|
| JP | H02-225726 A | | 9/1990 |
| JP | H05-077199 U | | 10/1993 |
| JP | H05-095979 U | | 12/1993 |
| JP | 2000-002737 | * | 6/1998 |
| JP | 2004-189396 A | * | 7/2004 |
| JP | 2004-189396 A | | 7/2004 |
| JP | 2011-063379 A | | 3/2011 |
| JP | 2015-182857 A | | 10/2015 |
| WO | WO 01/13187 A2 | | 2/2001 |

OTHER PUBLICATIONS

May 30, 2017, International Search Opinion issued for related PCT application No. PCT/JP2017/007514.

Nov. 20, 2019, European Search Report issued for related EP Application No. 17759920.6.

* cited by examiner

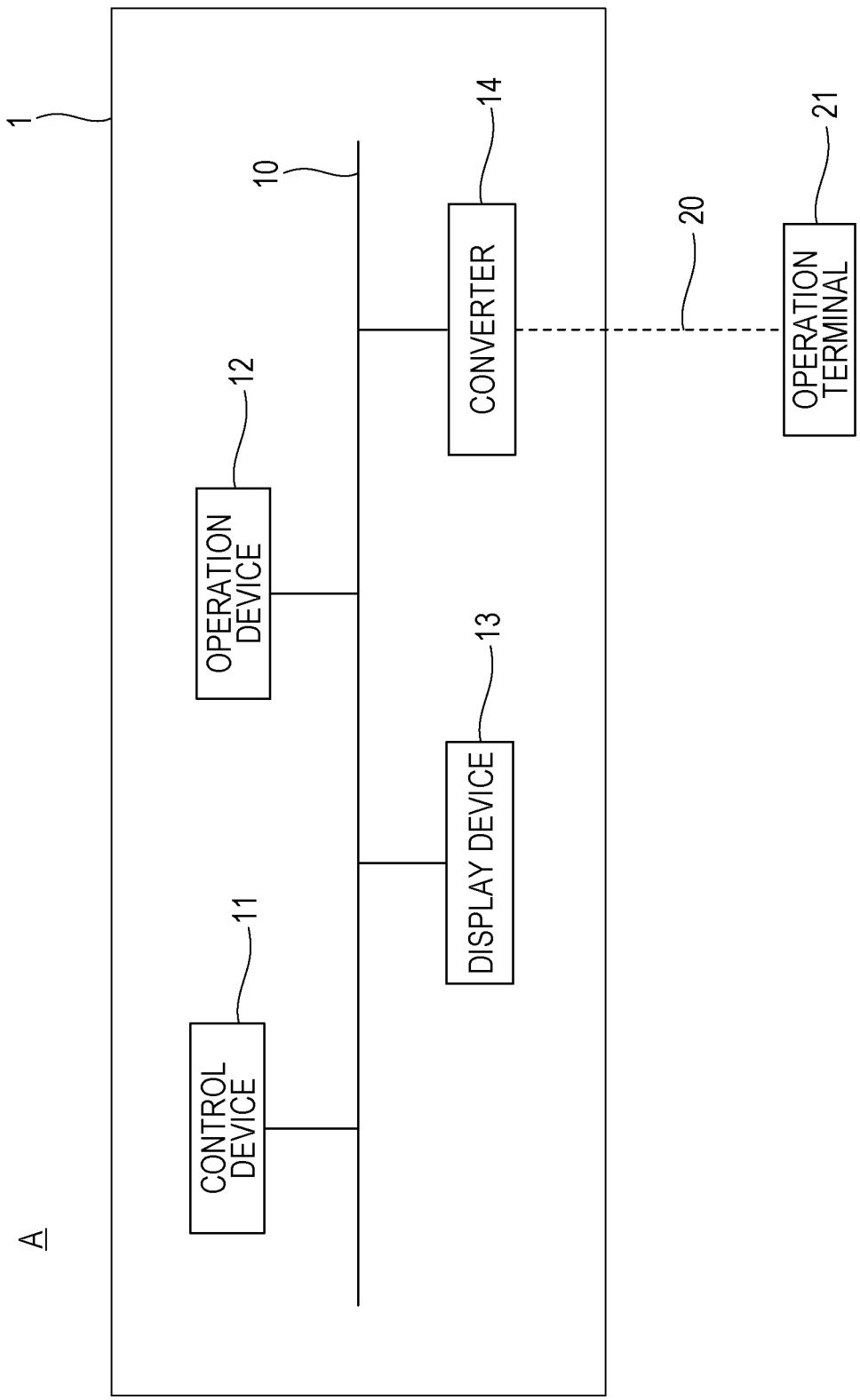

WORKING MACHINE AND OPERATION SYSTEM FOR WORKING MACHINE

CROSS REFERENCE TO PRIOR APPLICATION

This application is a National Stage Patent Application of PCT International Patent Application No. PCT/JP2017/007514 (filed on Feb. 27, 2017) under 35 U.S.C. § 371, which claims priority to Japanese Patent Application No. 2016-040682 (filed on Mar. 3, 2016), which are all hereby incorporated by reference in their entirety.

TECHNICAL FIELD

The present invention relates to a working machine and an operation system for a working machine. In particular, the present invention relates to a working machine and an operation system therefor that include an alternative means of an operation device of the working machine to be used in the event that, for example, the operation device has failed.

BACKGROUND ART

A control device and various operation devices are mounted on a mobile crane (see Patent Literature 1, for example). An operator can change a setting of a vehicle and a crane apparatus by operating the operation device. In the event that the operation device has failed, the operator cannot operate the mobile crane, and restoration may be difficult.

CITATION LIST

Patent Literature

Patent Literature 1: JP 2015-182857 A

SUMMARY OF THE INVENTION

Problems to be Solved by the Invention

The present invention has been conceived in view of the above, and an object of the present invention is to provide a working machine and an operation system therefor that include an alternative means of the operation device of the working machine to be used in the event that, for example, the operation device has failed.

Solutions to Problems

A working machine according to the present invention includes an operated function unit, an operation unit that transmits an intrinsic operation signal related to operation of the operated function unit, and a control unit that controls the operated function unit on the basis of either a false operation signal, which is transmitted from an operation terminal connected to the working machine via an external network, or the intrinsic operation signal.

An operation system for a working machine according to the present invention includes the above-described working machine, and the operation terminal connected to the working machine via the external network. The operation terminal transmits the false operation signal, which operates the working machine, to the external network. The control unit controls the operated function unit of the working machine on the basis of either the false operation signal or the intrinsic operation signal transmitted from the operation unit of the working machine.

Effects of the Invention

According to the present invention, the working machine and the operation system therefor, which include an alternative means of the operation device of the working machine to be used in the event that, for example, the operation device has failed, can be achieved.

BRIEF DESCRIPTION OF DRAWINGS

FIG. 1 is a block diagram of a working machine and an operation system A for a working machine according to a first embodiment of the present invention.

DESCRIPTION OF EMBODIMENTS

1. First Embodiment

Next, a first embodiment of the present invention will be described with reference to the accompanying drawing.

The operation system A according to the first embodiment of the present invention is applied to various working machines to be described later. Examples of the working machine include a mobile crane, a vehicle for work at height, a vehicle for use in both tracks and roads, and a hydraulic excavator. The operation system A is particularly suitable for a large mobile crane. Hereinafter, the operation system A that operates a mobile crane 1 will be described.

1.1 Operation System

As illustrated in FIG. 1, the operation system A includes the mobile crane 1 that is the working machine, an operation terminal 21, and an external network 20.

The mobile crane 1 includes a control device 11, an operation device 12, a display device 13, and a converter 14. These components are mutually connected to one another via an in-vehicle network 10.

1.2 In-Vehicle Network

The in-vehicle network 10 includes, for example, a communication line that interconnects in-vehicle devices (control device 11, operation device 12, display device 13, converter 14, etc.). A communication protocol of the in-vehicle network 10 is not particularly limited. Examples of the protocol of the in-vehicle network 10 include various protocols for use in vehicle control such as CAN, LIN, and FlexRay.

1.3 Control Device

The control device 11 is an on-board computer that includes an input terminal, an output terminal, a CPU, a memory, and the like. The control device 11 is a control unit and has a function of controlling the mobile crane 1. The number of the control device 11 is not limited to one. A plurality of the control devices 11 may be provided for each function. For example, a control device for vehicle control that controls a vehicle of the mobile crane 1, a control device for crane control that controls a crane apparatus of the mobile crane 1, and a control device that controls an overload preventing device may be individually provided as control devices. Incidentally, the vehicle, the crane apparatus, the overload preventing device, and the like with respect to the mobile crane 1 are operated function units of the working machine. Besides, various structures and various functions included in the mobile crane 1 are the operated function units.

1.4 Operation Device

The operation device 12 is an operation unit, which includes a switch, a lever, and the like for use in operation of the mobile crane 1. The operation device 12 is provided in, for example, a cab of the mobile crane 1. The number of the operation device 12 is not particularly limited, but a plurality of the operation devices 12 is commonly employed. Specifically, the operation device 12 includes, for example, a switch and a lever (hereinafter referred to as crane operation unit) for use in operations such as traveling of the mobile crane 1, operation of an outrigger (overhanging and storing, for example), operation of a boom (hoisting, telescoping, and turning, for example), operation of a hook (lifting and lowering, for example), and operation of a jib (overhanging and storing, for example).

The operation device 12 is connected to the control device 11 via the in-vehicle network 10. The operation device 12 transmits a specific operation signal to the in-vehicle network 10 in accordance with the operation of the operator. The operation signal is input to the control device 11 via the in-vehicle network 10. The control device 11 controls the mobile crane 1 on the basis of the received operation signal. In this manner, the operator can operate the mobile crane 1 using the operation device 12.

The operation device 12 may be, for example, a vehicle-system switch. Examples of the vehicle-system switch include a suspension level setting switch, a four-wheel-drive/two-wheel-drive changeover switch, and a changeover switch for a steering mode (normal, clamp, club, or rear). Commonly, only one vehicle-system switch and the above-described crane operation unit are mounted for each function. Accordingly, when the vehicle-system switch or the above-described crane operation unit fails, the mobile crane 1 cannot be operated by other means. More specifically, for example, when the operation device 12 with respect to the operation of the boom of the mobile crane 1 fails in a state where the boom is upright, the operator cannot perform operation such that the boom moves downward.

1.5 Display Device

The display device 13 is, for example, a liquid crystal display. The display device 13 is provided in, for example, the cab of the mobile crane 1. The display device 13 is, for example, a display of the overload preventing device. The number of the display device 13 may be one, or plural.

The display device 13 is connected to the control device 11 via the in-vehicle network 10. The control device 11 outputs, to the in-vehicle network 10, a working machine information signal indicating various information on the mobile crane 1. The working machine information signal is input to the display device 13 via the in-vehicle network 10. The display device 13 displays the various information on the mobile crane 1 on the basis of the working machine information signal in this manner, the operator can grasp a state of the mobile crane 1 through the display device 13.

1.6 Converter

The converter 14 has a function of converting the communication protocol of the in-vehicle network 10 and the communication protocol of the external network 20. The operation terminal 21 is connected to the external network 20. That is, the operation terminal 21 is connected to the converter 14 via the external network 20.

The converter 14 is attachable/detachable to/from the in-vehicle network 10, and is connected to the in-vehicle network 10 only when necessary. However, the converter 14 may not be detachable from the in-vehicle network 10. That is, the converter 14 may be continuously connected to the in-vehicle network 10.

The external network 20 may be a wireless network or a wired network. Examples of the wireless network include Wi-Fi, and Bluetooth (registered trademark). Examples of the wired network include USB.

1.7 Operation Terminal

The operation terminal 21 is a general-purpose computer that includes a CPU, a memory, and the like. The operation terminal 21 is, for example, a personal computer, a tablet terminal, or a smartphone. The operation terminal 21 can be disposed outside the cab of the mobile crane 1, depending on a configuration of the external network 20.

An application that operates the mobile crane 1 is installed in the operation terminal 21. The operator operates the mobile crane 1 by operating the operation terminal 21 and executing this application.

Specifically, the following processing is performed. When the operator operates the operation terminal 21, a specific operation signal is transmitted from the operation terminal 21 to the external network 20. The operation signal is input to the converter 14 via the external network 20. The converter 14 converts a protocol of the operation signal, which is then output to the in-vehicle network 10. The operation signal is input to the control device 11 via the in-vehicle network 10. The control device 11 controls the mobile crane 1 on the basis of the operation signal. In this manner, the operator can operate the mobile crane 1 using the operation terminal 21.

Hereinafter, the operation signal transmitted from the operation device 12 is referred to as an "intrinsic operation signal". On the other hand, the operation signal transmitted from the operation terminal 21 is referred to as a "false operation signal". The intrinsic operation signal and the false operation signal may have an identical message format or different message formats. An identifier that identifies the intrinsic operation signal and the false operation signal may be added in the message. Such an identifier may not be added, and the intrinsic operation signal and the false operation signal may not be distinguishable.

1.8 Processing of Operation System A

Next, processing of the operation system A will be described by taking a case where the operation device 12 has failed as an example.

In the event that the operation device 12 has failed, the operator connects the converter 14 to the in-vehicle network 10. Then, the operator operates the operation terminal 21 and activates the application for operation. The operation terminal 21 is then connected to the external network 20.

When the operator operates the operation terminal 21, the operation terminal 21 transmits the false operation signal to the external network 20. The false operation signal is transmitted to the control device 11 via the external network 20 and the in-vehicle network 10. The control device 11 controls the mobile crane 1 on the basis of the false operation signal.

In this manner, the false operation signal transmitted from the operation terminal 21 is transmitted to the control device 11, whereby the operator can operate the mobile crane 1 using the operation terminal 21. As a result, the operator can use the operation terminal 21 as an alternative means of the operation device 12 in the event that the operation device 12 has failed.

The operation system A also has a function of displaying the various information on the mobile crane 1 on the operation terminal 21. Hereinafter, details thereof will be described.

The various information on the mobile crane 1 is stored in the control device 11. The control device 11 outputs, to the in-vehicle network 10, the working machine information signal indicating the various information on the mobile crane 1. The working machine information signal is input to the converter 14 via the in-vehicle network 10. The converter 14 converts a protocol of the working machine information signal, which is then output to the external network 20. The working machine information signal is input to the operation terminal 21 via the external network 20. That is, the working machine information signal is transmitted to the operation terminal 21 via the in-vehicle network 10 and the external network 20. The operation terminal 21 displays the various information on the mobile crane 1 on the basis of the working machine information signal.

In this manner, the various information on the mobile crane 1 is displayed on the operation terminal 21, whereby the operator can grasp a state of the mobile crane 1 through the operation terminal 21. Accordingly, maintenance of the mobile crane 1 using the operation terminal 21 is facilitated.

Moreover, with the following configuration, the various information on the mobile crane 1 is displayed on the operation terminal 21 in real time.

The control device 11 outputs the working machine information signal to the in-vehicle network 10 on a constant basis. The converter 14 converts the protocol of the working machine information signal input from the in-vehicle network 10, which is then output to the external network 20 on a constant basis. The operation terminal 21 displays, on a display unit, the various information on the mobile crane 1 on the basis of the working machine information signal input from the external network 20. When the work information signal is updated, the operation terminal 21 updates the contents displayed on the display unit.

With this configuration, the working machine information signal is input to the operation terminal 21 on a constant basis, whereby the various information on the mobile crane is displayed on the display unit of the operation terminal 21 in real time. Accordingly, a state of the mobile crane 1 can be easily grasped. Note that the "constant basis" mentioned in the descriptions indicates, in addition to a state of continuing in time, a state of intermittingly continuing at a predetermined time interval.

The operation terminal 21 may be capable of switching between starting and stopping of the constant output of the working machine information signal to the external network 20 using the converter 14. Specifically, for example, the following configuration may be employed. When the operator performs a starting operation using the operation terminal 21, the operation terminal 21 outputs a start signal to the converter 14. Thereafter, the converter 14 outputs the working machine information signal to the external network 20 on a constant basis. When the operator performs a stopping operation using the operation terminal 21, the operation terminal 21 outputs a stop signal to the converter 14. Thereafter, no working machine information signal is output from the converter 14 to the external network 20.

With this configuration, a communication traffic of the external network 20 is reduced. Accordingly, even when a data amount of the false operation signal output from the operation terminal 21 is large, the false operation signal is securely transmitted to the converter 14. Moreover, in a case where communication charges are incurred in accordance with a communication volume of the external network 20, the communication charges are reduced.

2. Second Embodiment

Next, an operation system according to a second embodiment of the present invention will be described. A configuration of the operation system according to the present embodiment, is similar to the operation system A according to the first embodiment, and thus descriptions thereof are omitted. (see FIG. 1).

A control device 11 according to the present embodiment controls a mobile crane 1 on the basis of a false operation signal transmitted from an operation terminal 21 when a failure of an operation device 12 is detected. For example, the failure of the operation device 12 is detected as follows. The operation device 12 outputs an intrinsic operation signal to an in-vehicle network 10 on a constant basis.

Here, examples of the signal output by the operation device 12 on a constant basis include a signal indicating that the operation device 12 is not operated. Further, the signal output by the operation device 12 on a constant basis may be a signal indicating that the operation device 12 is performing a normal operation. In any case, the control device 11 may receive the signal output by the operation device 12 on a constant basis as a normal signal.

When the operation device 12 is normal, the intrinsic operation signal is input (received) to the control device 11 on a constant basis. In the event that the operation device 12 has failed, transmission of the intrinsic operation signal is stopped. When the intrinsic operation signal cannot be detected, the control device 11 determines that the operation device 12 has failed.

Alternatively, when a failure of the operation device 12 is detected, the operation device 12 may transmit, to the control device 11, an abnormality notification signal indicating the failure of the operation device 12. In this case, the failure of the operation device 12 is detected by, for example, a control unit (not illustrated) of the operation device 12. The abnormality notification signal mentioned above is transmitted by the control unit mentioned above. Then, when the abnormality notification signal from the operation device 12 is received, the control device 11 determines that the operation device 12 has failed.

Alternatively, the control device 12 may periodically transmits a state confirmation signal to the operation device 12. Then, when a confirmation signal from the operation device 12 in response to the above-mentioned state confirmation signal cannot be received, the control device 12 determines that the operation device 12 has failed.

In the present embodiment, the control device 11 controls the mobile crane 1 on the basis of the false operation signal transmitted from the operation terminal 21 when a failure of the operation device 12 is detected by the control device 11. At this time, the control device 11 enters a state in which the intrinsic operation signal of the operation device 12 is not accepted. Therefore, the mobile crane 1 is not simultaneously operated by both of the operation device 12 and the operation terminal 21, which is safe for operation.

The control device 11 controls the mobile crane 1 on the basis of the intrinsic operation signal transmitted from the operation device 12 when a failure of the operation device 12 is not detected.

In this case, information related to an operation signal may be displayed on a display device 13. The information related to an operation signal mentioned above is information about which of the intrinsic operation signal (i.e. operation device 12) and the false operation signal (i.e. operation terminal 21) is the basis for the control device 11 to control the mobile crane 1. The information related to an operation signal mentioned above is input from the control device 11 to the display device 13 via the in-vehicle network 10.

In this manner, an operator seated in a driver seat of the mobile crane 1 can recognize whether the mobile crane 1 is operated by the operation device 12 or the mobile crane 1 is operated by the operation terminal 21.

3. Third Embodiment

Next, an operation system according to a third embodiment of the present invention will be described. configuration of the operation system according to the present embodiment is similar to the operation system A according to the first embodiment, and thus descriptions thereof are omitted (see FIG. 1).

In the present embodiment, when an intrinsic operation signal transmitted from an operation device 12 and a false operation signal transmitted from an operation terminal 21 are input to a control device 11, the control device 11 does not accept the false operation signal and controls a mobile crane 1 on the basis of the intrinsic operation signal. That is, the control device 11 prioritizes operation of the operation device 12. The intrinsic operation signal and the false operation signal are distinguished on the basis of an identifier added in a message.

Moreover, when only one of the intrinsic operation signal and the false operation signal is input, the control device 11 controls the mobile crane 1 on the basis of the input operation signal. In this case, the control device 11 may control the mobile crane 1 on the basis of the false operation signal only in the event that a failure of the operation device 12 is detected in other words, when a failure of the operation device 12 is not detected, the control device 11 does not necessarily control the mobile crane 1 on the basis of the false operation signal.

In this manner, the control device 11 according to the present embodiment prioritizes the intrinsic operation signal transmitted from the operation device 12. Therefore, the mobile crane 1 is not simultaneously operated by both of the operation device 12 and the operation terminal 21, which is safe for operation.

In the present embodiment as well, information about which of the intrinsic operation signal and the false operation signal is the basis for the control device 11 to control the mobile crane 1 may be displayed on a display device 13.

4. Appendix

As a reference example 1 of as operation system for a working machine, the operation system for a working machine may include a control device that controls a working machine, a converter that is connected to the control device via an in-vehicle network and converts a communication protocol of the in-vehicle network and a communication protocol of an external network, and an operation terminal connected to the converter via the external network. The operation terminal may output a false operation signal for operating the working machine to the external network, the converter may convert a protocol of the false operation signal input from the external network and output the false operation signal to the in-vehicle network, and the control device may control the working machine on the basis of the false operation signal input from the in-vehicle network.

According to the reference example 1 described above, the false operation signal output from the operation terminal is transmitted to the control device, whereby the working machine can be operated using the operation terminal. As a result, the operation terminal can be used as an alternative means of an operation device in the event that the operation device has failed.

As a reference example 2 of the operation system for a working machine, the operation device that is connected to the control device via the in-vehicle network and outputs an intrinsic operation signal for operating the working machine to the in-vehicle network on a constant basis may be further included in the reference example 1, and the control device may control the working machine on the basis of the false operation signal when the intrinsic operation signal cannot be detected.

According to the reference example 2, the working machine is controlled on the basis of the false operation signal output from the operation terminal when the control device detects a failure of the operation device, whereby the working machine is not simultaneously operated by both of the operation device and the operation terminal, which is safe for operation.

As a reference example 3 of the operation system for a working machine, the operation device that is connected to the control device via the in-vehicle network and outputs the intrinsic operation signal for operating the working machine to the in-vehicle network may be further included in the reference example 1 or the reference example 2, and the control device may control the working machine on the basis of the intrinsic operation signal when the intrinsic operation signal and the false operation signal are input.

According to the reference example 3, the control device prioritizes the intrinsic operation signal output from the operation device, whereby the working machine is not simultaneously operated by both of the operation device and the operation terminal, which is safe for operation.

As a reference example 4 of the operation system for a working machine, a display device connected to the control device via the in-vehicle network may be further included in the reference example 2 or the reference example 3, and the display device may display information about which of the intrinsic operation signal and the false operation signal is the basis for the control device to control the working machine.

According to the reference example 4, an operator can recognize whether the working machine is operated by the operation device or the working machine is operated by the operation terminal.

As a reference example 5 of the operation system for a working machine, in the reference examples 1 to 4, the control device may output a working machine information signal to the in-vehicle network, the converter may a protocol of the working machine information signal input from the in-vehicle network and may output the working machine information signal to the external network, and the operation terminal may display information on the working machine on the basis of the working machine information signal input from the external network.

According to the reference example 5, the information on the working machine is displayed on the operation terminal, whereby maintenance of the working machine using the operation terminal is facilitated.

As a reference example 6 of the operation system for a working machine, in the reference examples 1 to 4 the control device may output the working machine information signal to the in-vehicle network on a constant basis, the converter may convert the protocol of the working machine information signal input from the in-vehicle network and may output the working machine information signal to the external network on a constant basis, and the operation terminal may display the information on the working machine on the basis of the working machine information signal input from the external network.

According to the sixth invention, the working machine information signal is input to the operation terminal on a constant basis, whereby the information on the working machine can be displayed in real time.

REFERENCE SIGNS LIST

A operation system
1 mobile crane
10 in-vehicle network
11 control device
12 operation device
13 display device
14 converter
20 external network
21 operation terminal

The invention claimed is:

1. A working machine, comprising:
    an operation unit that transmits an intrinsic operation signal related to operation of the working machine; and
    a control unit that controls the working machine on the basis of either the intrinsic operation signal or a false operation signal transmitted from an operation terminal connected to the working machine via an external network, wherein
    the control unit does not accept the false operation signal and controls the working machine on the basis of the intrinsic operation signal when the intrinsic operation signal and the false operation signal are input to the control unit, and
    the control unit controls the working machine on the basis of the false operation signal in either one of the following cases where:
    an abnormality notification signal from the operation unit is received;
    a normal signal transmitted from the operation unit cannot be received; or
    a confirmation signal from the operation unit in response to a state confirmation signal transmitted from the control unit cannot be received.

2. The working machine according to the claim 1, further comprising:
    a display unit that displays which of the intrinsic operation signal and the false operation signal is a basis for the control unit to control the working machine.

3. The working machine according to the claim 1, wherein the control unit transmits a working machine information signal, which is information related to a state of the working machine and is displayed on a terminal display unit of the operation terminal, to the operation terminal.

4. An operation system for a working machine, comprising:
    the working machine, comprising:
        an operation unit that transmits an intrinsic operation signal related to operation of the working machine; and
        a control unit that controls the working machine on the basis of either the intrinsic operation signal or a false operation signal transmitted from an operation terminal connected to the working machine via an external network; and
    the operation terminal connected to the working machine via the external network, wherein
    the operation terminal transmits a false operation signal that operates the working machine to the external network,
    the control unit does not accept the false operation signal and controls the working machine on the basis of the intrinsic operation signal when the intrinsic operation signal and the false operation signal are input to the control unit, and
    the control unit controls the working machine on the basis of the false operation signal in either one of the following cases where:
    an abnormality notification signal from the operation unit is received;
    a normal signal transmitted from the operation unit cannot be received; or
    a confirmation signal from the operation unit in response to a state confirmation signal transmitted from the control unit cannot be received.

* * * * *